US 6,541,055 B1

(12) United States Patent
Luzenberg

(10) Patent No.: US 6,541,055 B1
(45) Date of Patent: *Apr. 1, 2003

(54) POROUS PLASTIC DISPENSING ARTICLE

(75) Inventor: Robert S. Luzenberg, Birmingham, AL (US)

(73) Assignee: WorldDrink USA, LP, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,959

(22) Filed: Jan. 24, 2000

Related U.S. Application Data

(63) Continuation of application No. PCT/US99/02217, filed on Feb. 2, 1999, which is a continuation of application No. 09/017,062, filed on Feb. 2, 1998, now Pat. No. 6,024,012.

(51) Int. Cl.$^7$ ................................................ A47G 19/14
(52) U.S. Cl. .................... 426/433; 426/78; 426/82; 426/85; 426/115; 99/323; 99/323.2; 239/33; 239/34
(58) Field of Search ............... 99/323, 323.3, 99/323.2; 206/219, 220, 221, 568; 239/310, 326, 10, 315, 316; 222/187, 145.5; 424/439, 489; 604/83, 82, 500; 426/85, 433, 77, 78, 115, 82

(56) References Cited

U.S. PATENT DOCUMENTS

| 65,500 A | 6/1867 | Needham ................... 99/323.1 |
| 1,931,765 A | * 10/1933 | Leever ........................ 426/78 |
| 2,788,733 A | 4/1957 | Jacques ........................ 99/323 |
| 3,463,361 A | 8/1969 | Cook et al. ............... 222/144.5 |
| 3,480,403 A | 11/1969 | Hovey ........................... 23/282 |
| 3,567,118 A | 3/1971 | Shepherd ........................ 239/6 |
| 3,985,298 A | 10/1976 | Nichols ........................ 239/54 |
| 4,237,113 A | 12/1980 | Cardarelli .................... 424/78 |
| 4,286,754 A | 9/1981 | Jones ............................ 239/6 |
| 4,323,193 A | 4/1982 | Compton et al. .............. 239/44 |
| 4,423,670 A | 1/1984 | Tension ........................ 99/275 |
| 4,445,641 A | 5/1984 | Baker et al. .................... 239/6 |
| 4,769,144 A | 9/1988 | Nohren, Jr. .................. 210/282 |
| 4,891,232 A | * 1/1990 | Dahl ....................... 426/115 X |
| 4,921,713 A | * 5/1990 | Fowler ......................... 426/85 |
| 4,979,673 A | 12/1990 | Wilk ............................ 239/6 |
| 5,076,425 A | 12/1991 | Plone ......................... 206/220 |
| 5,094,861 A | * 3/1992 | D'Auguste et al. ............ 426/85 |
| 5,145,675 A | 9/1992 | Won ........................ 424/78.31 |
| 5,211,973 A | 5/1993 | Nohren, Jr. |
| 5,921,955 A | * 7/1999 | Mazer et al. ................. 604/83 |
| 5,934,493 A | * 8/1999 | Han ....................... 206/568 X |
| 6,109,538 A | * 8/2000 | Villani et al. ........... 239/310 X |

FOREIGN PATENT DOCUMENTS

WO    WO 98/15187    4/1998

OTHER PUBLICATIONS

Database WPI, Section Ch, Week 199517; Derwent Publications Ltd., London, GB; An 1995–125697, XP002199712 & JP 07 047357 A (Aquarelief KK), Feb. 21, 1995 *abstract*.

* cited by examiner

Primary Examiner—Reginald L. Alexander
(74) Attorney, Agent, or Firm—Woodard, Emhardt, Naughton, Moriarty & McNett LLP

(57) ABSTRACT

The present invention provides a porous plastic article for dispensing a soluble or dispersible dispensate into a fluid stream. An inventive article preferably comprise polyethylene or polypropylene and has defined therein a network of passages in fluid communication with pores on the exposed surface of the article, the pores preferably having a diameter of from about 20 microns to about 200 microns. In accordance with a preferred aspect of the invention, the dispensing article may be removably attached to a beverage container cap, a bottle neck or a conduit such as, for example, a sports-bottle straw, to introduce the substance into a fluid coming into contact with the article.

33 Claims, 8 Drawing Sheets

POROUS PLASTIC DISPENSING ARTICLE

This application is a continuation of PCT/US99/02217, filed Feb. 2, 1999, which is a continuation of U.S. patent application Ser. No. 09/107,062, filed Feb. 2, 1998 now U.S. Pat. No. 6,024,012.

BACKGROUND OF THE INVENTION

1. Field of the Invention

The present invention relates generally to articles for dispensing a soluble or dispersible material into a fluid. More specifically, the invention relates to articles for dispensing materials, such as, for example, flavoring materials, coloring materials, medications, minerals or caffeine into a beverage such as, for example, water, soda or tea, as the beverage flows from a container or through a conduit. Inventive articles comprise porous plastic which defines a network of internal passages in fluid communication with pores on exposed surfaces of the article, the passages advantageously containing a dispensate and introducing the dispensate into a fluid stream that passes in contact with the article.

2. Discussion of Related Art

Efforts have been made in the prior art to devise ways of flavoring liquids without physically mixing flavoring material into the liquid prior to the time of consumption. This has been attempted in the prior art by impregnating the material of an ordinary drinking straw, such as heavy paper, with a flavoring material. Among other limitations of such an approach is the fact that the amount of flavoring available in such a manner is very limited and after a small quantity of liquid has been drawn through the straw it must be discarded in favor of a new one.

There has also been disclosed a flavoring device in which a flavor-containing mechanism is attached to a straw such that flavoring material held therein is in fluid communication with the straw's fluid passageway. As such, U. S. Pat. No. 3,463,361 to Cook et al. discloses a flavoring device comprising a conduit having an inlet and an outlet and having attached to the conduit, intermediate the inlet and the outlet, a chamber for receiving flavoring material. Means communicating between the flavoring chamber and conduit are disclosed whereby liquid drawn into the inlet and through the conduit is contacted with the flavoring material prior to exit from the conduit at the outlet.

The above methods, however, have not gained widespread acceptance or use. Therefore, at present, beverages are typically flavored by physically mixing flavoring materials into a liquid prior to the time the liquid is consumed, to provide a flavored beverage. Thus, the consumer is generally faced with the following two options: (1) purchasing a powdered additive and mixing the same with, for example, tap water to make a beverage having the desired additives therein, or (2) simply purchasing a pre-made (and typically pre-bottled) beverage. There are, however, several disadvantages associated with these options, which disadvantages are overcome by the present invention.

With respect to powdered additives, reference will be had for the sake of example to powdered lemonade, powdered fruit drinks, such as, for example, KOOL-AID® powders, powdered GATORADE® and powdered medications, such as THERA-FLU®. These products are widely available in, for example, grocery stores and the like, and may be mixed by the consumer in varying amounts with tap water or other liquids to make varying quantities of flavored beverages or doses of medicine having varying concentrations. One disadvantage of such a product is that, in a situation where only a single serving (i.e., about 5 to about 20 fluid ounces) is desired at any given time, the overall requirement of time and effort required to prepare beverages is large. Alternatively, a large quantity of flavored beverage may be made in a single batch; however, in such a situation it is difficult to predict the exact quantity that will be needed, and it is not uncommon for a large amount of such a beverage to be wasted.

With regard to pre-made flavored beverages, it is well known that there are presently available in the marketplace a wide variety of bottled beverages which essentially comprise flavorings and/or other substances that are dissolved into water and then bottled for sale in various quantities, typically single-serving quantities such as, for example, 12–20 fluid ounces or 1–2 liters. Examples include lemonades; sweetened and unsweetened tea products; caffeinated and uncaffeinated tea products; flavored tea products; a wide variety of sodas, including regular sodas, diet sodas, caffeine-free sodas, caffeine-rich sodas; mineral waters; and the like. Also available are fountain drinks of all kinds that may be purchased, for example, at convenience stores, grocery stores or gas stations.

One disadvantage associated with the purchase of a pre-made beverage is that a single beverage commonly costs about a dollar, irrespective of the quantity purchased. A lower price may be available if the beverages are purchased in bulk, such as, for example, a 12-pack or a 24-pack; however, this requires transportation and storage of a large, heavy and bulky package. Another disadvantage of purchasing pre-made and/or pre-bottled beverages is that a separate container must be made, used and disposed of for each unit consumed. This not only increases the amount of litter which must be collected at great cost, but also increases the cost of producing and shipping single-unit beverages and uses up large amounts of raw materials, which are needed to make such a large number of beverage containers. While many beverage containers may be recycled, this too involves large cost and effort, and a large proportion of single-unit beverage containers are disposed of rather than recycled.

In light of the above, there has been a long-felt need for an improved manner of providing beverages having water-soluble and/or water-dispersible additives therein. The present invention overcomes these problems by providing methods, compositions and articles for introducing dispensate materials into a beverage, as the beverage flows from a container or through a conduit, to thereby advantageously produce a treated beverage. A dispensate may be introduced into a fluid stream in accordance with the invention by simply providing tap water or other beverage in a beverage container (preferably a reusable beverage container), and passing or placing the water or other beverage in contact with an inventive dispensing article such that the dispensate is introduced into the liquid. Inventive articles may be advantageously used, for example, to dispense one or more minerals into tap water to provide mineral water, to dispense flavoring materials, caffeine or coloring additives into tap water or into a pre-made beverage, and to dispense one or more medicines into tap water to provide a predetermined single-unit dose of medicine.

SUMMARY OF THE INVENTION

The present invention overcomes the aforementioned problems by providing dispensing articles for dispensing materials into a fluid stream contacted therewith, and related products and methods. In accordance with one aspect of the invention, there is provided an article for introducing a dispensate into a fluid stream, comprising (1) a porous plastic matrix defining an internal network of passages and defining pores on the exposed surface of the matrix in fluid communication with the passages, the pores having an average size of from about 20 microns to about 200 microns; and (2) a water-soluble or water-dispersible dispensate material, the dispensate residing within the passages.

In another aspect of the invention, there is provided an assembly for introducing a dispensate into a fluid stream, comprising (1) an article comprising a porous plastic matrix defining an internal network of passages and defining pores on the exposed surface of the matrix in fluid communication with the passages, the pores having an average size of from about 20 microns to about 200 microns; and a water-soluble or water-dispersible dispensate material, the dispensate residing within the passages; and (2) a cap for a bottle having a fitting portion thereof for sealingly cooperating with a bottle neck; wherein said article is operatively attached to said cap.

According to another aspect of the invention, there is provided an assembly for introducing a dispensate into a fluid stream, comprising (1) an article comprising a porous plastic matrix defining an internal network of passages and defining pores on the exposed surface of the matrix in fluid communication with the passages, the pores having an average size of from about 20 microns to about 200 microns; and a water-soluble or water-dispersible dispensate material, the dispensate residing within the passages; and (2) a bottle having a neck which defines a passageway into the bottle; wherein said article is operatively attached to said neck.

In accordance with another aspect of the invention, there is provided an article for introducing a dispensate into and filtering a fluid stream, comprising (1) a first member comprising a first porous plastic matrix defining a first internal network of passages and defining pores on the exposed surface of the first matrix in fluid communication with the first passages; and a particulate activated carbon contained within the first passages; and (2) a second member comprising a second porous plastic matrix defining a second internal network of passages and defining pores on the exposed surface of the second matrix in fluid communication with the second passages; and a water-soluble or water-dispersible dispensate material, the dispensate residing within the second passages.

In accordance with another aspect of the invention, there is provided an article for introducing a dispensate into and filtering a fluid stream, comprising (1) a filtering member comprising a first porous plastic matrix defining a first internal network of passages and defining pores on the exposed surface of the first matrix in fluid communication with the first passages; and a particulate activated carbon contained within the first passages; and (2) a plurality of dispensing members embedded within the filtering member, wherein the dispensing members comprise a second porous plastic matrix defining a second internal network of passages and defining pores on the exposed surface of the second matrix in fluid communication with the second passages; and a water-soluble or water-dispersible dispensate material, the dispensate residing within the second passages.

It is an object of the invention to eliminate the need for premixing a wide variety of beverages having water-dispersible and/or water-soluble additives therein, by providing methods, compositions, articles and assemblies for advantageously introducing a dispensate into a fluid stream such as, for example, a beverage, as the fluid is contacted with the dispensing article.

It is also an object of the invention to provide an improved manner of delivering a predetermined dose of medicine or other active agent to a patient by providing an article having entrained therein a predetermined dose, which is dispensed into a fluid stream coming into contact with the article.

It is another object of the invention to provide an improved manner of making mineral water by providing an article having entrained therein water-dispersible or water-soluble minerals which are dispensed into a fluid stream coming into contact with the article.

It is also an object of the invention to provide an improved manner of making a beverage having flavoring materials, coloring additives and/or caffeine therein by providing an article having entrained therein water-dispersible or water-soluble flavoring materials, coloring additives and/or caffeine, which are dispensed into a fluid stream coming into contact with the article.

It is a further object of the invention to provide products which facilitate the reuse of beverage containers, thereby reducing the amount of waste currently created due to the use and disposal of single-unit, single-use beverage containers.

Further objects, advantages and features of the present invention will be apparent from the detailed description herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

DETAILED DESCRIPTION OF PREFERRED EMBODIMENTS

Figure 1:
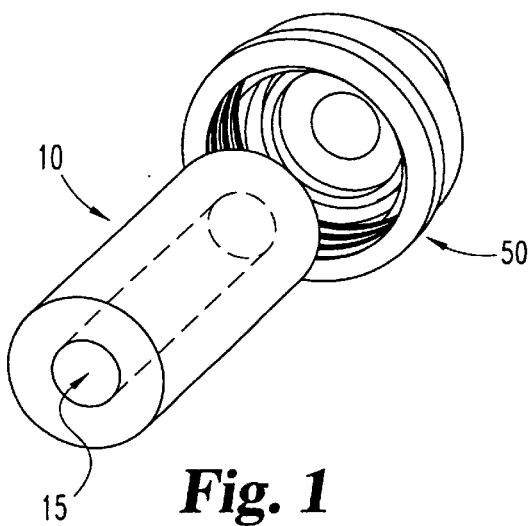
FIG. 1 is an exploded perspective view of an assembly in accordance with one aspect of the invention, the assembly including a dispensing article and a bottle cap having a dispensing closure.

For purposes of promoting an understanding of the principles of the invention, reference will now be made to particular embodiments of the invention and specific language will be used to describe the same. It will nevertheless be understood that no limitation of the scope of the invention is thereby intended, such alterations and further modifications in the invention, and such further applications of the principles of the invention as described herein being contemplated as would normally occur to one skilled in the art to which the invention pertains.

Provided by the present invention are novel compositions, methods and articles for introducing dispensate materials such as, for example, flavoring materials, coloring materials, medications, minerals or caffeine into a beverage such as, for example, water, soda or tea, as the beverage flows from a container. There are presently available in the marketplace a wide variety of bottled beverages which essentially comprise flavorings and/or other substances that are dissolved into water and then bottled for sale in various quantities, typically single-serving quantities. Also present in a large number are fountain beverages, which are made by combining streams of various ingredients as they flow into a receptacle such as, for example, a beverage cup or glass. Further, there are also available in the marketplace a wide variety of powdered flavoring products which may be mixed with water by a consumer to provide fruit drinks such as lemonades, tea products, and other flavored beverages, as well as powdered medicines which may be mixed with water to provide a desired dose.

In view of the above, however, there has not been disclosed in the prior art an advantageous article for dispensing flavoring materials, coloring materials, minerals, medicines, caffeine and the like into a beverage as the beverage flows from a bottle or other container. The present invention provides such an article. One significant advantage of such an article is that it may be used to flavor tap water and, therefore, provides a ready source of a beverage, a dose of medicine or the like. An inventive article comprises a porous plastic matrix, which contains within the matrix a material that is soluble or dispersible in a fluid such as, for example, an aqueous fluid. The material remains within the matrix until a fluid stream is passed over an exposed surface of the matrix, at which time the material wicks into the stream and becomes dissolved or dispersed therein. The material, termed "dispensate" or "dispensate material" herein, may be one of a wide variety of substances, being limited only by the necessity that the material be soluble and/or dispersible in a fluid stream.

While the preferred embodiments described in detail herein may be advantageously used to dispense water-soluble and/or water-dispersible materials into tap water, such as, for example, to dispense powdered lemon flavoring and/or tea into tap water to provide lemonade, tea or lemon tea, it is understood that such embodiments may also be used to dispense such materials into other pre-made beverages such as, for example, soda or tea. For example, an article for dispensing cherry or vanilla flavor may be used for flavoring a soda to provide an excellent cherry or vanilla soda; or an article for dispensing a lemon flavor may be used for flavoring tea to provide lemon tea. Also, substances other than flavoring substances may be added to a beverage using the principles of the invention. For example, an article for dispensing minerals may be used to prepare mineral water; or an article for dispensing medicines, such as, for example, pain relievers and fever reducers (e.g., acetaminophen), antihistamines (e.g., chlorpheniramine maleate), nasal decongestants (e.g., pseudoephedrine HCl), cough suppressants (e.g., dextromethorphan HBr) and/or other cold and/or flu medicines may be used in conjunction with tap water to deliver a desired dose of the medicine.

As the introduction of a powder dispensate into a fluid stream occurs when the stream contacts the porous exposed surface of an inventive article, it is understood that the dispensate will generally enter the stream at a rate proportional to the surface area of the article which comes into contact with the stream. While a wide variety of shapes and sizes are contemplated by the present invention, certain preferred embodiments are described herein, and illustrated in the drawings, which are advantageously configured to be attached, for example, to a beverage container neck; to a bottle cap; or to a conduit, such as a straw, for drawing a beverage out of a container during intake by the drinker. Alternate preferred embodiments illustrated and described herein may simply be placed into a container that holds a beverage, or a conduit through which a beverage passes, such that a beverage held in or passed through the container or conduit contacts the article.

Figure 2:
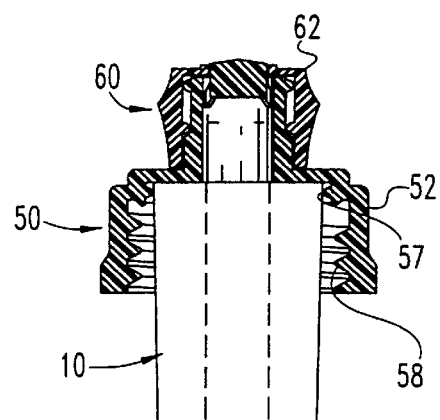
FIG. 2 is a side elevational view of an assembly in accordance with one aspect of the invention, the assembly including a dispensing article and a bottle cap having a dispensing closure and a manual valve, the cap and valve being shown in cross-sectional view, and the valve being shown in the closed position.
Figure 6:
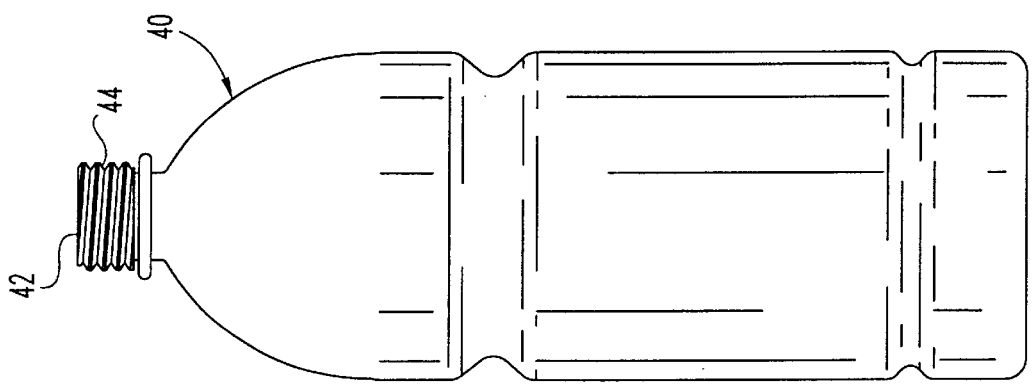
FIG. 6 is a side elevational view of a beverage container.

Referring to the drawings, FIG. 1 shows in exploded view an inventive assembly which comprises a bottle cap and an inventive article having a generally tubular shape. This assembly is depicted in partial cross section in FIG. 2 in its engaged orientation. The bottle cap may preferably be of the type that comprises a manual valve, or a "pop-up" dispensing closure, as shown in FIGS. 1 and 2. The pop-up bottle cap 50 is preferably made of plastic and has fitting portion 52 that cooperates with and closes neck or open end 42 of a bottle 40, such as that shown in FIG. 6. Additionally, cap 50 includes bottle neck engaging portion 58 which cooperates with cap engaging portion 44 of bottle 40 to releasably hold cap 50 on neck 42 of bottle 40. As depicted in FIG. 2, bottle neck engaging portion 58 of cap 50 is preferably threaded to mate with a threaded cap engaging portion 44 of bottle 40. The article 10 shown in FIG. 1 defines a longitudinal recess 15 through which a fluid may pass in contact with the exposed surface of the article 10.

In this embodiment, the article 10 is formed such that it may be operatively and, in a preferred embodiment, removably, attached to the cap 50. In this embodiment, article 10 has an outside diameter that is less than the inside diameter of neck 42 of bottle 40 so that article 10 is positioned with respect to cap 50 within bottle 40 when cap 50 engages neck 42 of bottle 40. In a preferred manner of attaching an inventive article 10 to a cap 50, the article 10 is sized to fit snugly into the cap 50, such that the outer diameter of the article 10 seats in and engages retention groove 57 of the cap 50, to releasably connect the article to the cap 50. As such, the article 10 may be snapped into place by pressing the article 10 into the cap 50, and the article 10 is held in place by frictional forces. It is well within the purview of a skilled artisan to select an appropriate size to achieve such attachment. Alternatively, a rubber gasket, or "O-ring," may be placed around the article 10 at one end for attachment to a cap 50. When an article 10 is attached to a cap 50, the article 10 essentially provides a conduit through which a liquid stream passes before passing through the dispensing aperture of the bottle cap 50.

Manual valve 60 is operatively associated with cap 50 and is manually movable between a position allowing fluid to flow therethrough, and a position not allowing flow therethrough. More specifically, valve 60 is a push-pull type valve that is connected to cap 50. Therefore, it has reciprocal portion 62 that is manually and reciprocally movable between an open first position in which reciprocal portion 62 is most remote from cap 50, and a closed second position in which reciprocal portion 62 is closest to cap 50. Such valves are known in the art, and a wide variety of designs may be employed in the practice of the present invention.

Figure 3:
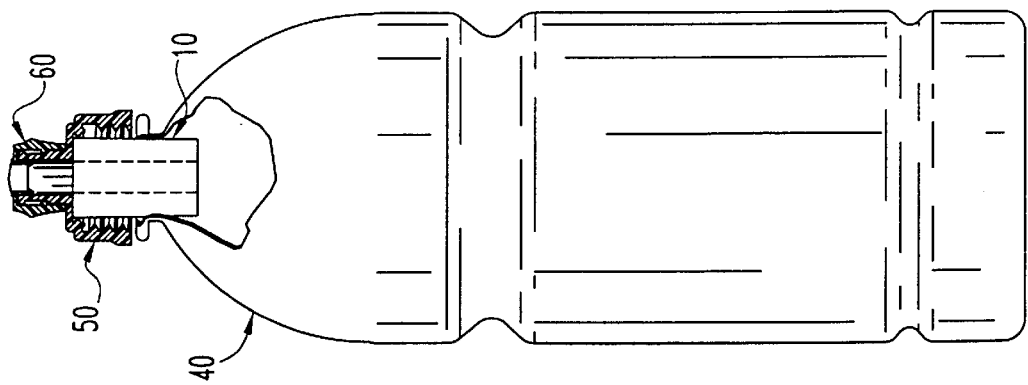
FIG. 3 is a side elevational view of an assembly in accordance with one aspect of the invention, the assembly including the dispensing article, cap and manual valve of FIG. 2, attached to a beverage container, the beverage container having a cut-away neck and the cap and valve being shown in cross section.

An inventive article may be advantageously used, therefore, by connecting an inventive article 10 to a bottle cap 50, placing a beverage in a beverage container, such as a bottle 40, configured to receive the bottle cap 50, and attaching the bottle cap 50 to the container 40 to provide an inventive assembly. This assembly is depicted in FIG. 3. When manual valve 60 is moved to the open position, the beverage passes from the container, i.e., upon creation of a pressure gradient in the bottle 40 by, for example, squeezing the bottle 40 or creating suction at the open end 42 of the bottle 40 or turning the bottle upside down. The fluid thereby passes in contact with the article 10, and through the cap 50 during intake by the drinker, or as the fluid is poured into another container, and dispensate is thus introduced into the beverage as it contacts the article.

Figure 4:
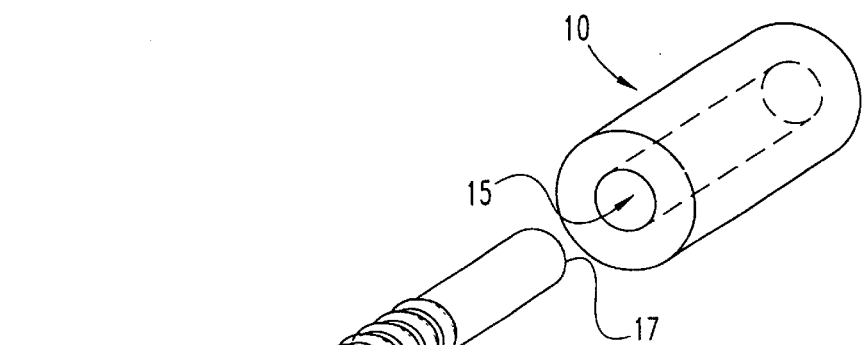
FIG. 4 is an exploded perspective view of an assembly in accordance with one aspect of the invention, the assembly including a dispensing article and a sports bottle straw.
Figure 5:
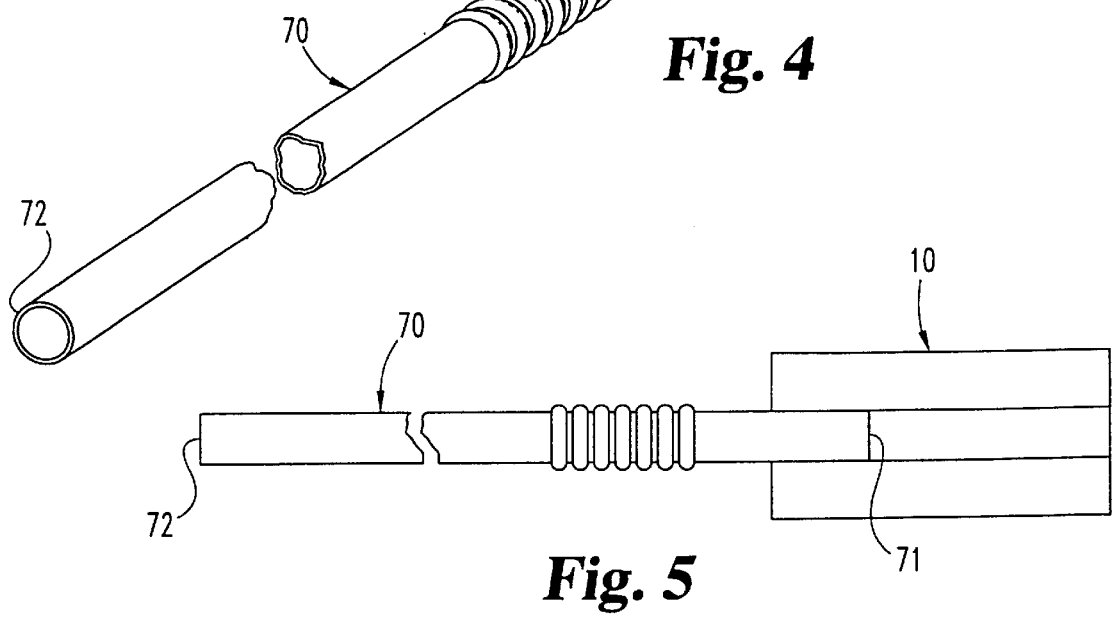
FIG. 5 is a side elevational view of an assembly in accordance with one aspect of the invention, the assembly including a dispensing article and a sports bottle straw, the article being shown in cross-sectional view.

Alternatively, an inventive article may be configured for attachment to a conduit such as, for example, a sports-bottle straw 70, for passing a beverage out of a beverage container. Such an embodiment is depicted in exploded view in FIG. 4, in which the sports-bottle straw has a first end 71 and a second end 72, wherein the first end 71 is configured for frictional engagement to an inventive article, as depicted in partial cross section in FIG. 5. In this embodiment, the diameter of the recess 15 through the article is advantageously selected such that a sports-bottle straw 70 fits snugly into the recess 15. The article 10 is thereby removably connected to the straw by frictional forces, yet may be removed and replaced by a fresh article when the supply of dispensate in the article is exhausted.

Figure 20:
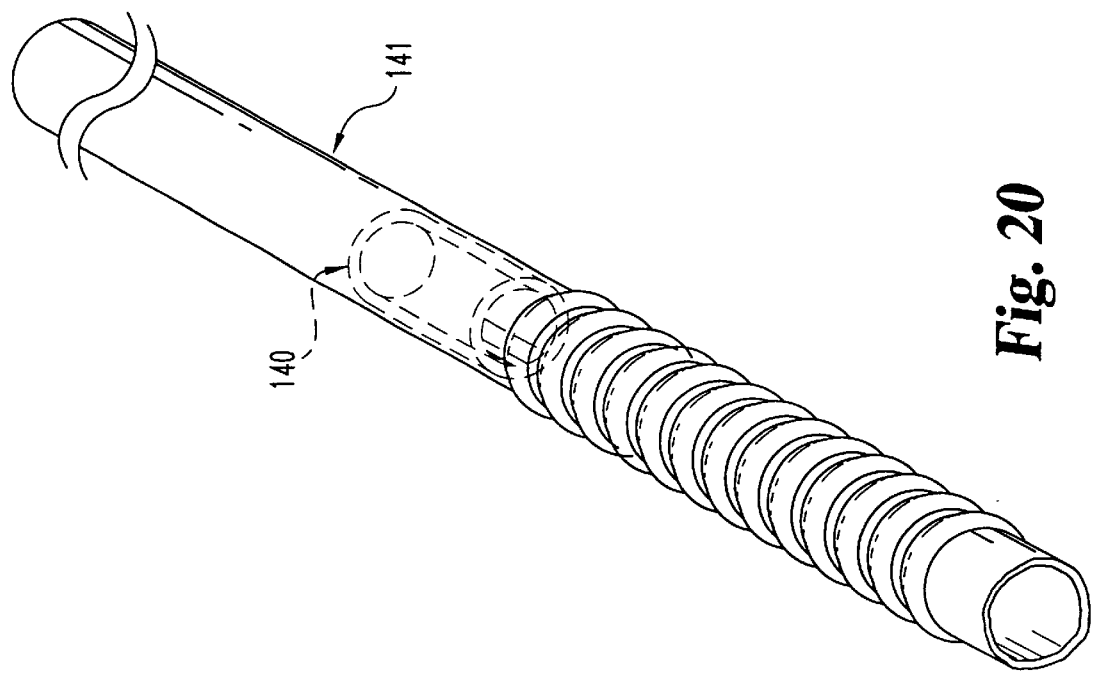
FIG. 20 is a perspective view of the assembly of FIG. 19.
Figure 19:
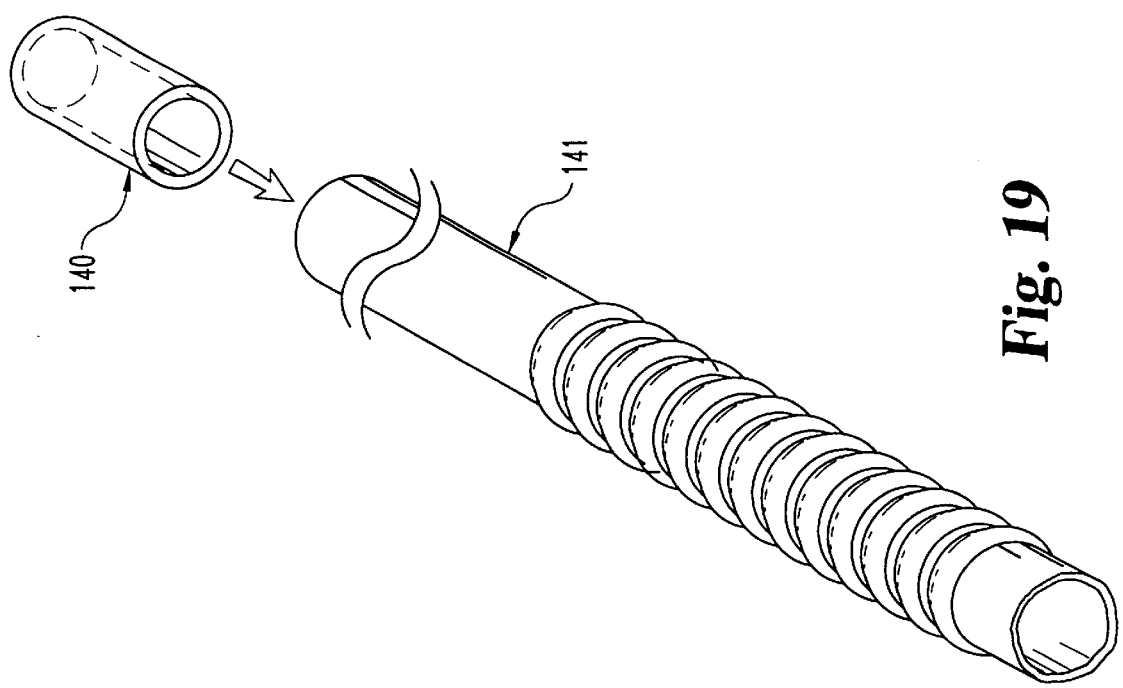
FIG. 19 is an exploded perspective view of an assembly in accordance with one aspect of the invention, the assembly including an inventive dispensing article and a straw.
Figure 22:
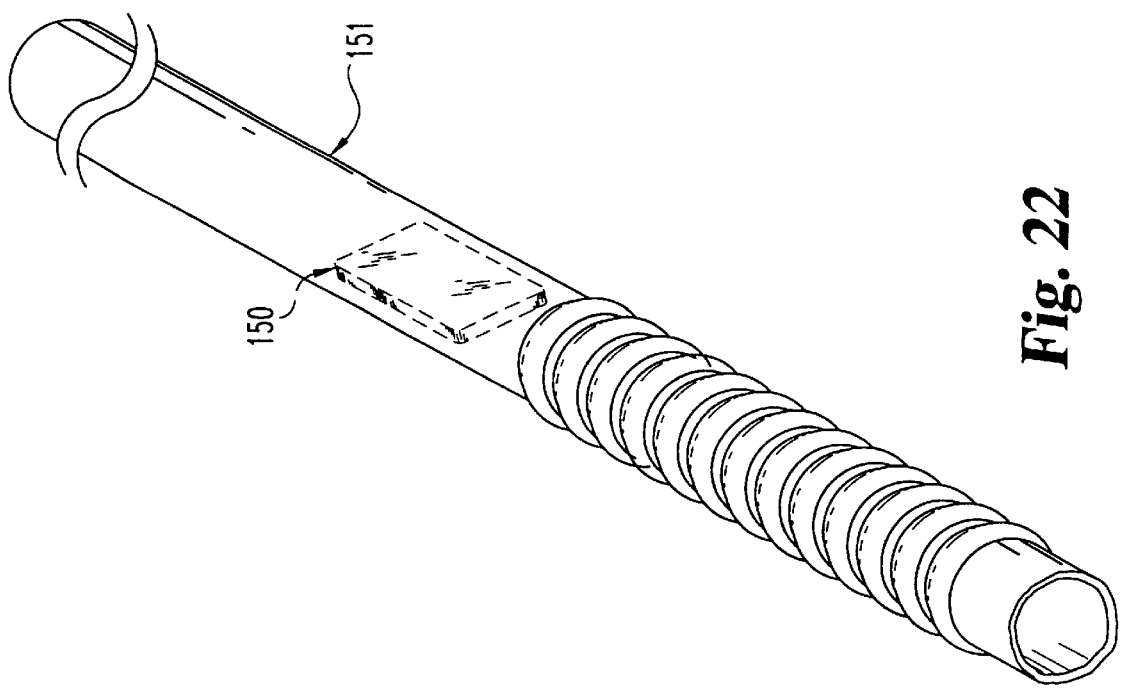
FIG. 22 is a perspective view of the assembly of FIG. 21.
Figure 21:
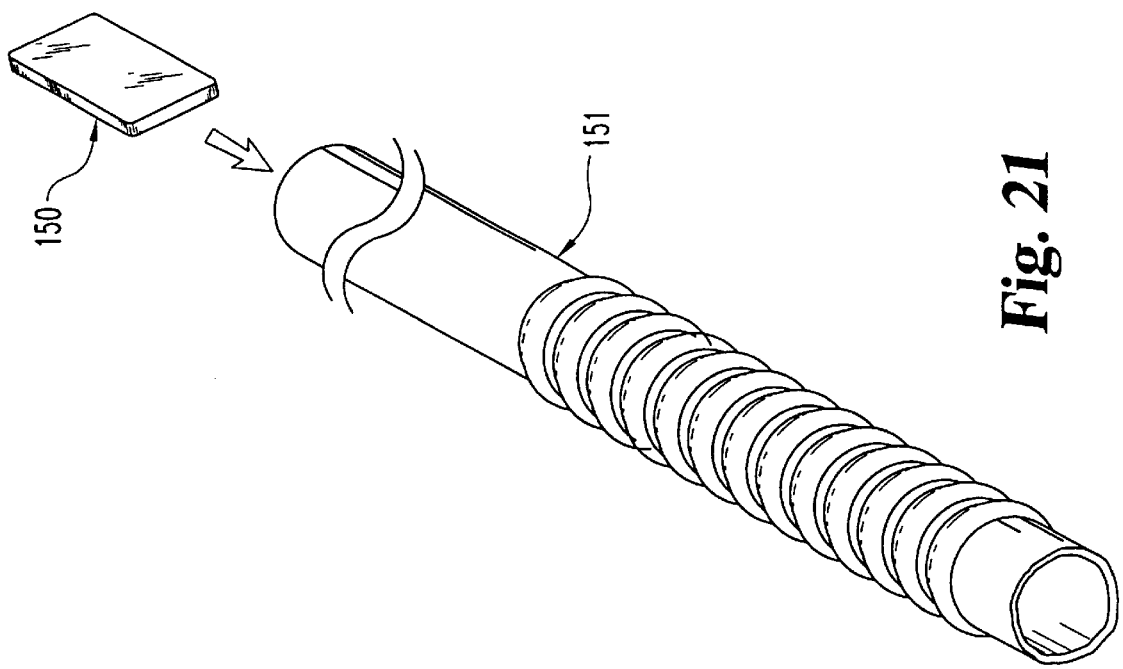
FIG. 21 is an exploded perspective view of an assembly in accordance with one aspect of the invention, the assembly including an inventive dispensing article and a straw.

An inventive article may alternatively be configured for attachment inside such a conduit. For example, in the embodiment depicted in FIGS. 19 and 20, the article 140 is configured to have an outside diameter whereby the article fits snugly inside a conduit, such as, for example, a straw 141, by friction. In this embodiment, it is preferred that the article be positioned near the top of the straw 141 so that a beverage will not contact the article 140 until it is drawn through the straw 141. The article may alternatively have a wide variety of shapes, so long as the article is capable of being frictionally fitted inside the conduit. Another advantageous shape is depicted in FIGS. 21 and 22, wherein article 150 is also frictionally attached inside a straw 151.

Figure 18:
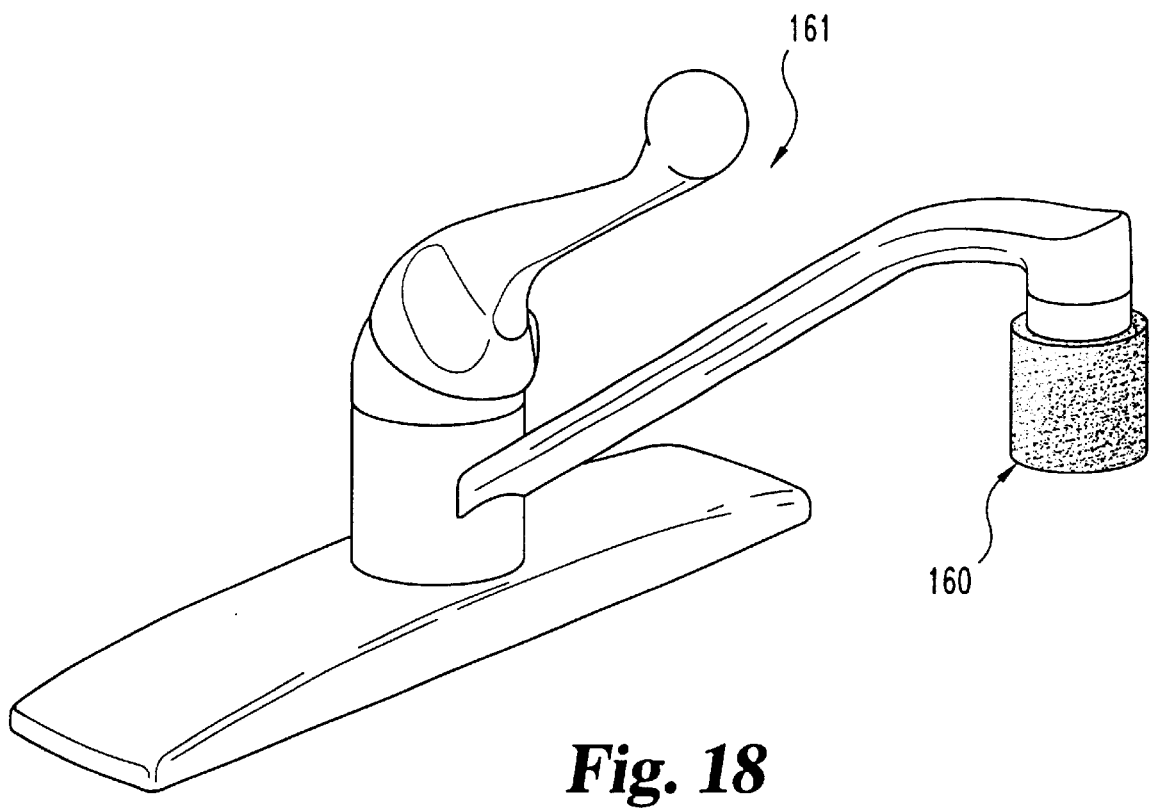
FIG. 18 is a perspective view of an embodiment of the invention in which an inventive article is attached to a faucet.

In another embodiment of the invention, an article is configured for attachment to a spigot or faucet, such as, for example, a water cooler spigot or a kitchen faucet. In the embodiment depicted in FIG. 18, water passing from a faucet 161 advantageously receives dispensate from the article 160 as it flows in contact therewith.

Figure 7:
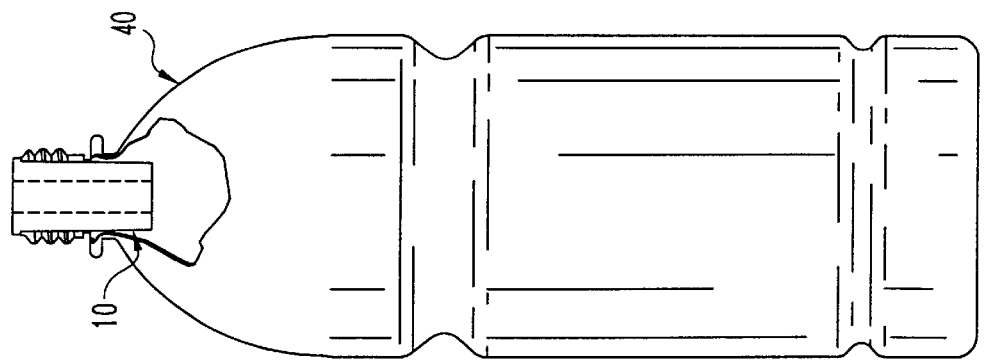
FIG. 7 is a side elevational view of an assembly in accordance with one aspect of the invention, the assembly including a dispensing article and a beverage container, the beverage container having a cut-away neck.

An inventive article may also be configured to be operatively attached to a bottle neck itself. For example, as depicted in FIG. 7, an inventive article 10 may be operably connected to a bottle 40 or other container, rather than to a bottle cap, such that fluid may be poured from the container to introduce dispensate thereinto. In this embodiment, the article 10 is conveniently configured to snugly fit within the neck 42 of the bottle 40 and to be held in place by friction. It is readily understood by a skilled artisan that a conventional beverage container cap, i.e., one not having a dispensing closure may be readily placed over the container/article assembly, for example, as the container/article assembly is shipped and/or stored.

Figure 8:
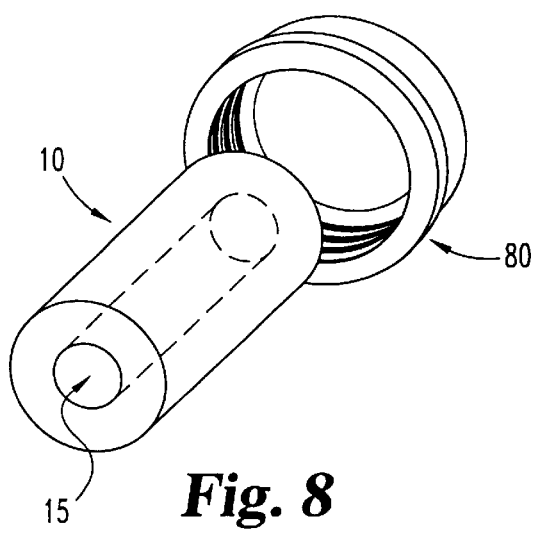
FIG. 8 is an exploded perspective view of an assembly in accordance with one aspect of the invention, the assembly including a dispensing article and a conventional bottle cap.
Figure 9:
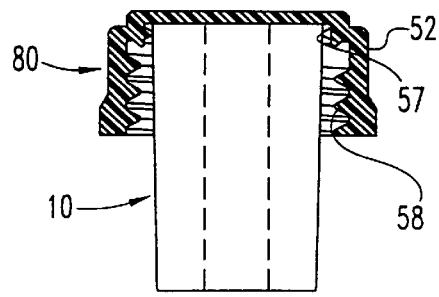
FIG. 9 is a side elevational view of an assembly in accordance with one aspect of the invention, the assembly including a dispensing article and a conventional bottle cap, the cap being shown in cross-sectional view.

In an alternate aspect of the invention, the article is attached to a conventional cap 80, as shown in FIGS. 8 and 9, and therefore is withdrawn when the cap 80 is removed from the bottle 40. In this aspect of the invention, the cap 80 and the article 10 are removed from the bottle 40 before a beverage is poured therefrom. It is important in this embodiment that the article be positioned in contact with the beverage, for example, during shipping or storage of the container, so that the dispensate entrained within the article may be introduced into the beverage by a wicking action from the article prior to removal of the cap/article assembly from the bottle. This orientation may be conveniently achieved simply by storing or shipping a beverage "upside down" in a container that is capped by such an assembly. Stated alternatively, after a beverage is introduced into the container and the cap 80/article 10 assembly is sealingly attached thereto, the bottle may be turned 180 degrees in the vertical plane to orient the cap 80/article 10 assembly at or near the bottom surface of the fluid in the container. Thus, after a period of time, the dispensate will be introduced into the fluid and the beverage will be ready for consumption.

Figure 10:
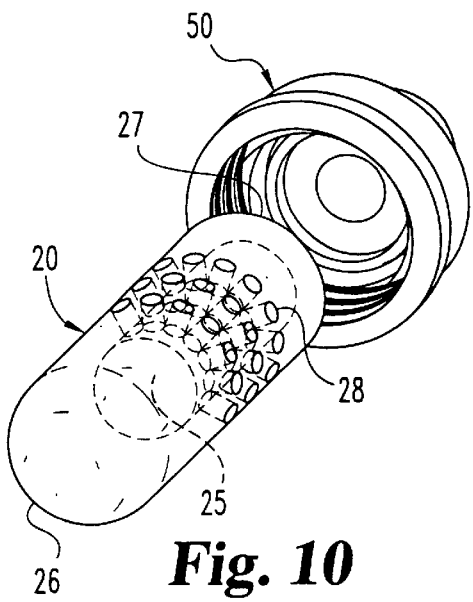
FIG. 10 is an exploded perspective view of an assembly in accordance with one aspect of the invention, the assembly including a dispensing article and a bottle cap having a dispensing closure.

While examples of a number of advantageous shapes are described in the specific embodiments set forth above, the advantageous result of the invention may alternatively be achieved by making an article 20, as shown in FIG. 10, that has a generally cylindrical shape, an internal recess 25, a substantially closed first end 26, a substantially open second end 27 and a plurality of radial apertures 28 formed to pass a beverage into the recess 25 and in contact with the surfaces of the article which define the apertures and the recess. It is seen that the surfaces defining the apertures and the surface of the recess, all constitute exposed surfaces of the article as this term is used herein. The article thus formed may be connected to a bottle cap or a conduit such that the open second end 27 is operably (and preferably removably) connected (i.e., by friction) to the bottle cap or conduit. In use, a fluid stream passes into the recess 25 through one or more of the apertures 28, and then passes through the open second end 27 and through the bottle cap 50 or conduit 70. Again, as the aqueous stream passes through the apertures 28 and through the recess 25, in contact with the exposed surfaces of the article 20, dispensate is introduced into the stream to provide a beverage having a dispensate dissolved or dispersed therein.

In an alternative aspect of the invention, a dispensing article need not be configured for attachment to a bottle cap, a drinking straw, a bottle neck or the like. In this embodiment, the article may be used by simply placing the article into a beverage container or into a container, recess or conduit through which a beverage passes. For example, such an article may simply be placed into a bottle, pitcher or other container, either before or after a beverage is placed into the bottle, pitcher or other container. When the beverage contacts the article, the dispensate will be introduced into the beverage. In this embodiment, it may be desirable for the article to have a relatively large average pore size so that the dispensate will pass relatively quickly into the beverage.

Figure 17:
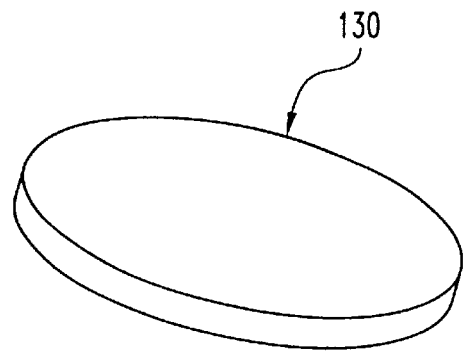
FIG. 17 is a perspective view of an article that may be placed into a beverage container or conduit in accordance with the invention.

In another advantageous application of the invention, an article is prepared having a flavor dispensate desirable for addition to coffee, such as, for example, vanilla flavoring, hazelnut flavoring or cinnamon flavoring. The article may be placed into a conventional coffee maker along with coffee grounds, and, as heated water is passed in contact with the coffee grounds in this embodiment, it also contacts the article. As a result, the desired flavor is advantageously introduced into the coffee as it is being made to provide an excellent flavored coffee. Of course, the article may alternatively be placed in the coffee pot or other container positioned to receive the coffee from the coffee maker. In this orientation, the flavor will be introduced into the coffee in the pot after the coffee has been made. While the invention contemplates that such an article may have a wide variety of shapes, for ease of manufacture, packaging and shipping, an excellent shape is a simple disk, such as the article 130 depicted in FIG. 17.

While the shapes of various preferred inventive articles are described above, it is readily understood that a wide variety of alternate shapes and sizes are contemplated by the invention. Preferably, shapes and sizes are selected such that fluid contact with an inventive article is optimized for a certain application.

In addition to the shape, or "macrostructure," of an inventive article, another important aspect of the invention is the internal structure, or "microstructure," of an inventive article. An inventive article comprises a porous plastic matrix defining an internal network of passages. The matrix further comprises "pores" which pass through its exposed surfaces in fluid communication with the internal passages and also with the article's environment. As used herein, the term "exposed surface" is intended to refer to a surface of an inventive article with which a fluid stream comes into contact as it flows in contact with the article. Stated alternatively, an exposed surface is defined with respect to an article's macrostructure as a surface which defines the shape of the article and which generally defines the boundary between the article and its environment, whether or not the surface is visible from a point external of the article.

An "internal passage" or an "internal network of passages" refers to the compositional microstructure of an inventive article, and refers to spaces defined internally, i.e., within the porous plastic matrix. An internal passage is distinct for purposes of describing the present invention from a recess or an aperture defined by an inventive article. A "recess" or an "aperture," which terms are used above in relation to the shape of an inventive article, lies external of the exposed surface of an article and is a macrostructural feature of an inventive article. As is readily understood by a person skilled in the relevant art, characteristics of internal passages may be varied by varying, for example, the size of granule materials used to make inventive articles and/or the temperature and/or the pressure used in a molding process for making the article. In contrast, characteristics of recesses may be varied simply by varying the size and/or shape of a mold used to make an inventive article.

An inventive article is prepared in accordance with the invention such that a porous plastic matrix, having a network of internal, interconnected passages therein, holds a dispensate material until a fluid stream comes into contact with an exposed surface of the article, at which time the dispensate material wicks to the surface of the article and into the stream. In one manner of making an inventive article, a granular thermoplastic polymer is mixed with a dry water-soluble or water-dispersible powder and the mixture is then molded at a predetermined temperature and pressure. As used herein, the term "powder," is intended to refer to a substantially dry, particulate solid material. In an alternate aspect of the invention, the water-soluble or water-dispersible material selected to be dispensed using an inventive dispensing article is a liquid. In this aspect of the invention, an inventive dispensing article may be made by mixing the liquid dispensate material with thermoplastic polymer granules prior to molding, as described above, or a granular thermoplastic polymer may be molded in the absence of a dispensate material and the liquid dispensate then introduced into the internal passages.

The polymer may be one of a wide variety of thermoplastic polymers available commercially; however, as the polymer is intended to come into contact with beverages, it is understood that the polymer is preferably one that satisfies relevant safety requirements. The dispensate may be one of a wide variety of substances available commercially. For example, the dispensate may be a flavoring powder, a mineral mix, caffeine or a medicine. It is understood that the dispensate selected for use may also be a combination of the above, such as, for example, a flavored dose of medicine or a caffeinated fruit drink. Alternatively, the dispensate may be a liquid formulation including a wide variety of substances that may be added to a fluid stream.

In one manner of making a preferred dispensing article in accordance with the invention, a mixture of a granular thermoplastic polymer and a powdered dispensate is provided. The mixture thus provided is then molded at a preselected temperature and pressure to make an inventive article. A wide variety of molding techniques may be used in accordance with inventive methods, such techniques being known in the art. While it is not intended that the present invention be limited by any theory by which it achieves its advantageous result, it is believed that, as the polymer granules are heated, the outer surfaces thereof become softened or tacky. When this occurs, pressure exerted upon the mixture causes the polymer granules to contact one another and adhere together. Thereafter, when the article cools, the points of contact become relatively strong points of adhesion, thus providing a relatively strong composite that is resistant to dusting, crumbling and breaking in the course of normal usage.

It is understood that a wide variety of material specifications (such as polymer type, polymer size, granule size distribution, dispensate powder type, dispensate powder particle size distribution and ratio of polymer to dispensate) and also a wide variety of process parameters (such as temperature and pressure) may be used in accordance with the invention to provide articles having various advantageous characteristics. For example, inventive articles may be made in accordance with the invention that have differing rates of introduction of dispensates into a fluid stream. These rates of introduction are believed to be dependent in part upon the dimensions of the internal passages and pores, which may be controlled by varying the material specifications and process parameters described herein. It is within the ability of a skilled artisan, armed with the description of the present invention, to select, without undue experimentation, advantageous combinations of materials and parameters in accordance with the invention to provide articles having differing rates of dispensate release.

To provide articles in accordance with the invention having differing dispensate-release characteristics, articles are made in which the overall volume of the internal passages differ (thereby varying the amount of dispensate that the article holds) and/or in which the dimensions of the internal passages and the pores differ (thereby varying the rate at which the dispensate wicks from the article into a fluid stream). Dimensions of the internal passages and of the pores of an inventive article may be varied, for example, by selecting thermoplastic polymer granules having larger or smaller granular sizes, by adjusting the process temperature or process pressure at which inventive articles are molded, and/or by varying the ratio of polymer granules to dispensate powder in a mixture to be molded into an inventive article. In a preferred aspect of the invention, the pores have an average size of from about 20 to about 200 microns. More preferably, the pores have an average size of from about 40 microns to about 150 microns, and most preferably, from about 134 microns to about 144 microns. It is understood that the dimensions of the internal passages will have a direct correlation to the sizes of the pores.

Additionally, it is understood by a skilled artisan that different thermoplastic polymers or polymers having different molecular weights typically have different melting and solidifying characteristics. Therefore, it is within the purview of a skilled artisan to select a polymer suitable for a given application. In this regard, a number of companies presently produce porous plastic articles, such as, for example, M. A. Industries, Inc., Peachtree, Ga.; Porex Technologies Corp, Fairburn, Ga.; Gen Pore, Inc., Redding, Pa.; and Innerflow, Inc., New York, N.Y. It is within the skill of employees of these companies to vary dispensing characteristics in accordance with the invention without undue experimentation.

Thermoplastic polymer granules used to make an inventive article preferably have a size distribution wherein at least about 90% of the granules are between about 30 and about 120 mesh. More preferably, at least about 90% of the granules are between about 50 and about 100 mesh, and most preferably, about 90% are between about 50 and about 70 mesh. It is understood that, where it is desired that the dispensate be released relatively quickly from an inventive article, a larger granule size may preferably be selected and, where it is desired that the powder be dispensed more slowly, a smaller granule size may preferably be selected.

In making a dispensing article in accordance with one aspect of the invention, the mixture of polymer granules and dispensate powder to be molded preferably has a polymer:dispensate ratio of from about 6:4 to about 9:1 by weight, more preferably from about 7:3 to about 8:2 by weight. The preferred ratio, however, will depend upon the specific starting materials selected for use and the size distributions thereof (or physical characteristics where the dispensate is a liquid).

It is important in inventive methods that the polymer granules are present in sufficient quantity that, upon application of pressure, substantially every granule is in contact with at least two other granules, and preferably with three or more other granules. When the temperature of the mixture is raised to a satisfactory level for molding in accordance with the invention, and the outer surfaces of the polymer granules are softened to a tacky state, the points of contact between granules provide points of adhesion. Upon subsequent cooling of the article, the points of adhesion become strengthened to provide a relatively strong bond. Thus, where the ratio of polymer granules to dispensate particles is sufficiently high, there exist sufficient points of contact to provide an article having good tensile strength and powdering/crumbling resistance. It is understood that an article molded using a mixture having an excessive proportion of dispensate therein may have an unsatisfactory tensile strength, or may fail to form at all.

It is also understood that a polymer granule to dispensate particle ratio that is relatively high will result in an article which releases dispensate into a fluid stream relatively slowly and in a relatively small overall quantity. In certain aspects of the invention, such as, for example, where a medication is desired to be introduced from an inventive article into a fluid stream at a relatively slow rate, a high polymer:dispensate ratio will be preferred. In alternate embodiments, however, where, for example, flavorings, minerals or higher doses of medicines are desired, a lower polymer:dispensate ratio is preferred, within a desired range for making a sufficiently strong dispensing article.

It is important in the practice of the invention to avoid a molding temperature or pressure that is too high or too low. In the case of the former (i.e., excessive temperature and/or pressure), the article may become overly compacted, thereby causing the polymer to encase the dispensate powder, resulting in an article which resembles a solid block. This phenomenon is believed to impair or destroy the interconnected internal network of passages and eliminate the dispensing function of the article. Where the temperature and/or pressure is too low, the resulting molded article may not have adequate tensile strength and, therefore, may have a tendency to crumble or break apart.

For purposes of efficiency in making an inventive article, it is preferred that the polymer selected for use in accordance with the invention have a melting temperature of from about 115° F. to about 415° F., more preferably from about 190° F. to about 340° F. and most preferably from about 240° F. to about 290° F. In accordance with one preferred aspect of the invention, the thermoplastic polymer used to make an inventive article is polyethylene. A polyethylene material which may advantageously be used in accordance with the invention is HOLTALEN GHR 8020, which is commercially available from Hoechst AG, Werk Ruhrchemie, D-46128 Oberhausen.

It is understood that, where it is desired that the powder be dispensed relatively quickly from an inventive article, a lower temperature and/or pressure may preferably be selected in the molding process. In contrast, where it is desired that the powder be dispensed more slowly, a higher temperature and/or pressure may preferably be selected. It is also understood that the use of other advantageous thermoplastic polymers, such as, for example, polypropylene, may result in a different preferred range of temperatures and pressures. It is within the purview of a skilled artisan to determine the preferred ranges of temperature and pressure for a given thermoplastic polymer based upon the principles of the invention.

An article that comprises a liquid dispensate held within the internal network of passages defined by a porous plastic matrix may alternatively be made by first forming a porous lastic matrix, and then introducing a liquid dispensate into the internal network of passages to provide a dispensing article. To make the porous plastic matrix, a granular thermoplastic polymer is first molded into a desired shape as described above but in the absence of a dispensate material. A liquid dispensate may then be introduced into the internal passages of the formed article, for example, by placing the article in a substantial vacuum and then immersing the article in the liquid dispensate so that the dispensate flows through the pores and into the internal network of passages. Having introduced the liquid dispensate into the article in this manner, the article may then be advantageously used as described herein to dispense the liquid into a fluid stream as the stream comes into contact with the article. It is also understood that an inventive article that has become spent, i.e., in which the dispensate has been exhausted, may advantageously be recharged with a liquid dispensate as described. Normal usage of an inventive article does not substantially alter the advantageous internal structure of the porous plastic matrix.

In alternative advantageous aspects of the invention, inventive articles are provided which perform a filtering function as well as a dispensing function. It is understood that an article not to be used for filtering, but to be used primarily for dispensing, such as those described above, will preferably be configured such that the target fluid passes in contact therewith, but such that no pressure gradient is created across the article. As such, it is seen that a substantial portion of the fluid will not pass through the article, but will simply pass in contact with the article to receive dispensate therefrom. It is expected that a minor portion of the fluid will pass through the pores and enter the internal passages and, indeed, it is believed that the passage of some fluid into the article will enhance the dispensing properties of the article. However, because there is substantially no pressure gradient across the article, a substantial portion of the fluid does not pass through the internal passages of the article and the dispensate is therefore introduced into the fluid at a more even rate and for a longer period of time.

In contrast, in an article configured for use as a filtering/dispensing article, it is understood that substantially all of the fluid must be passed through the pores and internal passages to achieve a satisfactory level of filtering. Thus, a pressure gradient across the article will be necessary to cause substantially all of the fluid to pass through the article. This is particularly apparent when the average pore size of the article is, for example, from about 5 to about 25 microns. To achieve an acceptable rate of flow through the article, it is necessary to create a pressure gradient across the article, for example, by applying a negative pressure to the portion of the article opposite the fluid (i.e., by suction), or by applying a positive pressure to the portion of the article in contact with the fluid (i.e., by squeezing a bottle containing the fluid).

Figure 11:
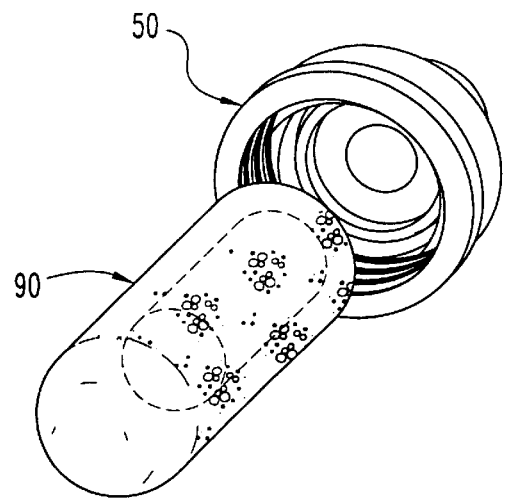
FIG. 11 is an exploded perspective view of an assembly in accordance with one aspect of the invention, the assembly including a filtering/dispensing article and a bottle cap having a dispensing closure.

In one manner of achieving this dual filtering/dispensing functionality, an article is made by providing a mixture of polymer granules and a powdered dispensate, as described above, and further adding to the mixture a particulate activated carbon. The mixture thus provided is then molded at a preselected temperature and pressure to make an inventive filtering/dispensing article 90, as shown in FIG. 11. As described above, a wide variety of molding techniques may be used in accordance with inventive methods and a wide variety of material specifications and parameters may be used to provide articles having a variety of desired characteristics. Activated carbon is readily available commercially and it is preferred in the practice of the invention that the carbon have a mesh size substantially between about 50 and about 325 mesh. More preferably, the activated carbon has a mesh size substantially between about 80 and about 200 mesh.

In making a filtering/dispensing article 90 in accordance with this aspect of the invention, the mixture of polymer granules, activated carbon and dispensate powder to be molded preferably has a (polymer+dispensate):carbon ratio of from about 6:4 to about 8:2 by weight, more preferably from about 6.5:3.5 to about 7.5:2.5 by weight and most preferably of about 7:3 by weight. As described above, however, the preferred ratio depends upon, among other things, the specific starting materials selected for use and the size distributions thereof.

While a filtering/dispensing article, as described, may preferably feature pore sizes as described above with respect to articles used primarily for dispensing, it is understood by those skilled in the art that smaller pore sizes may be preferred for some uses so that the article will more effectively filter impurities from the fluid. For example, in one aspect of the invention, it is preferred that the filtering/dispensing article feature an average pore size of from about 5 microns to about 60 microns.

It is understood, as mentioned above, that an article prepared as described for simultaneously filtering a fluid and introducing a dispensate thereinto will preferably be configured such that substantially all of a target fluid will necessarily pass through the pores and internal passages, rather than simply pass in contact with the article. A fluid that does not pass through the pores and internal passages will not be filtered. A consequence of passing substantially all of the fluid through the article is that the dispensate will be quickly dispensed into the fluid as it passes through the article. Such a result is advantageous, for example, where it is desired to dispense a dispensate into a small amount of fluid and/or to dispense a dispensate quickly into a fluid. In one aspect of the invention, an inventive filtering/dispensing article 90 has a generally tubular configuration with a first open end and a second closed end, the open end being configured to be attached to a bottle cap or a conduit as described above and as depicted in exploded view in FIG. 11. With this configuration, substantially all of the fluid passing from the container will pass through the inventive filtering/dispensing article 90. It has been found, as mentioned above, that passing fluid through the matrix in this manner also causes the powdered dispensate to pass initially into a beverage relatively quickly, with the rate of introduction rapidly decreasing thereafter. While this may be an advantageous result in certain applications, it will commonly be desired for the dispensate to be introduced into the aqueous stream at a slower and more continuous rate.

In an alternate aspect of the invention, therefore, there is provided an article 100 which provides a filtering function and a more even dispensing function than the filtering/dispensing article 90 described above. This article 100, depicted in FIG. 12, comprises a first member 101 having a generally tubular configuration defining a longitudinal recess 105 therein, with a first closed end 106 and a second open end 107, the open end 107 being configured for sealed attachment to a bottle cap 50, 80, a bottle neck 42 or a conduit 70 as described above. The first member 101 comprises a porous plastic matrix having contained therein activated carbon, and provides the filtering function to the article. This member is preferably formed to have an average pore size of from about 5 to about 200 microns, more preferably from about 5 to about 60 microns. The article 100 further comprises a second member 110 formed to reside within the recess 105 of the first member 101. The second member 110 provides the dispensing function and comprises a porous plastic matrix and a dispensate material, and preferably has an average pore size as described above in reference to dispensing article. The second member 110 dispenses the dispensate into a fluid stream that has already passed through the first member 101 as the stream passes in contact with the second member 110.

It is understood that a pressure gradient will be necessary to cause the fluid to pass through the filtering member. There will preferably not be pressure gradient, however, across the one or more dispensing members. As such, the fluid will pass in contact with the dispensing member(s), but will not substantially pass through the dispensing members, thereby resulting in a relatively even introduction of the dispensate into the fluid.

Figure 12:
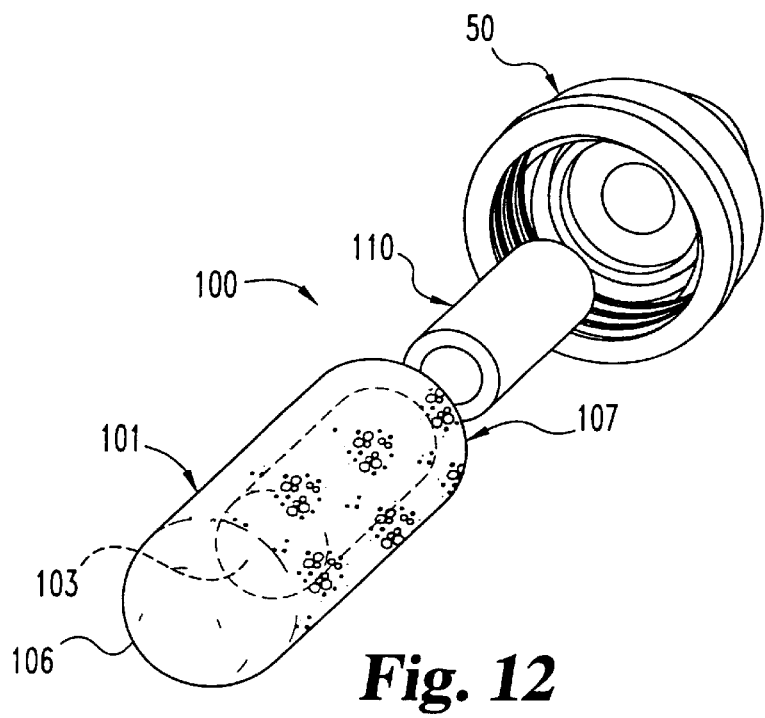
FIG. 12 is an exploded perspective view of an assembly in accordance with one aspect of the invention, the assembly including a filtering/dispensing article and a bottle cap having a dispensing closure.
Figure 13:
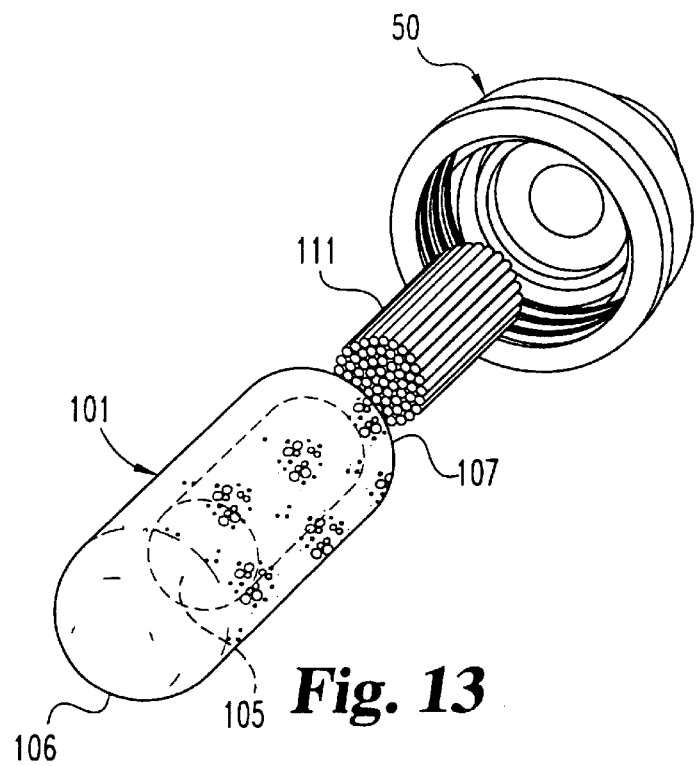
FIG. 13 is an exploded perspective view of an assembly in accordance with one aspect of the invention, the assembly including a filtering/dispensing article and a bottle cap having a dispensing closure.

The second member 110 may have a wide variety of configurations including, but not limited to, a generally tubular configuration as set forth in FIG. 12, a generally flat configuration as depicted in FIGS. 21 and 22, a closed-end configuration having radial apertures therein analogous to the dispensing article set forth in FIG. 10, or one or more solid cylinders 111 configured to be retained within the recess 105, as set forth in FIG. 13. It is understood that a dispensing article or dispensing cylinder made in accordance with this aspect of the invention will be sized to fit within the recess of the filtering member 101. Additionally, the configurations of the filtering member 101 and the dispensing member 110, 111 are such that, upon application of a pressure gradient, a beverage such as, for example, tap water, passes through the filtering member 101 at a desirable rate for drinking, and then passes in contact with the dispensing member 110, 111. It is believed that the best dispensing properties are obtained when the beverage passes in contact with, but not through, the dispensing member 110, 111.

Figure 14:
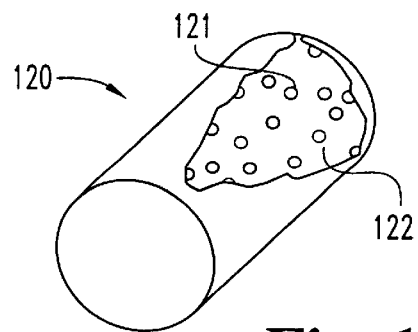
FIG. 14 is a partial cross-sectional perspective view of a filtering/dispensing article having dispensing members imbedded in a filtering member.
Figure 15:
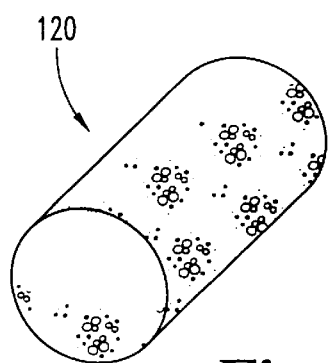
FIG. 15 is a perspective view of the filtering/dispensing article shown in FIG. 14.
Figure 16:
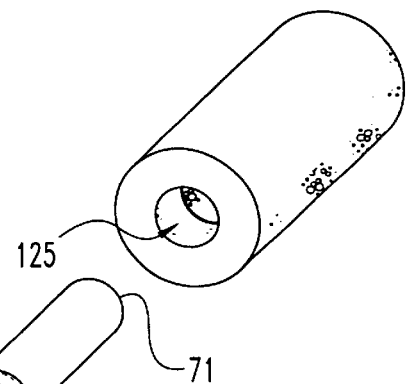
FIG. 16 is an exploded perspective view of an assembly in accordance with one aspect of the invention, the assembly including a filtering/dispensing article and a sports bottle straw.
Figure 16:

In an alternate aspect of the invention, there is provided a dual-purpose filtering/dispensing article 120 which comprises one or more dispensing members 121 embedded within a filtering member 122 as shown in FIG. 14. The one or more dispensing members 121 are preferably embedded within the filtering member by a process which comprises (1) forming a plurality of dispensing members 121, wherein the dispensing members have an internal structure as dispensing articles and members described above and have a dispensate residing therein; (2) mixing the pre-formed dispensing members 121 with a granular thermoplastic polymer and particulate activated carbon to provide a mixture; and (3) molding the mixture to provide a filtering/dispensing article 120 having one or more dispensing members 121 embedded within a filtering member 122. In one preferred embodiment, the dispensing members are formed to have substantially spherical or ovoid configurations. Such dispensing members preferably have diameters of from about 1 mm to about 10 mm, more preferably from about 2 mm to about 8 mm and most preferably from about 2 mm to about 5 mm. An article formed in accordance with this aspect of the invention preferably has a generally cylindrical shape, as depicted in FIG. 15 (a "block design") or a tubular shape such as the filtering member 101 shown in FIGS. 12 and 13, configured to be attached, for example, to a beverage container neck; to a bottle cap; or to a conduit, such as a sports-bottle straw, for drawing a beverage out of a container during intake by the drinker. It is understood that, for attachment to a conduit, it is preferred that the article have a recess 125 formed therein for insertion of the conduit, as depicted in FIG. 16.

It is expected in an article configured as shown in FIG. 14 and described above in relation thereto, that a portion of the fluid passing through the filtering member will also pass through the dispensing members by virtue of the overall pressure gradient. Thus, this aspect of the invention is expected to find advantageous use in applications wherein it is preferred that the dispensate is introduced into the fluid relatively quickly.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An article for introducing a dispensate into a fluid stream, comprising:
   a porous plastic matrix defining an internal network of passages and defining pores on the exposed surface of the matrix in fluid communication with the passages, the pores having an average size of from about 20 microns to about 200 microns; and
   a water-soluble or water-dispersible dispensate material, the dispensate residing within the passages;
   wherein the article is configured for attachment to a spigot or a faucet.

2. The article in accordance with claim 1, wherein the article is operably attached to the spigot or the faucet whereby a beverage passing through the spigot or the faucet passes in contact with the article.

3. The article in accordance with claim 2, wherein the article is frictionally attached to the spigot or the faucet.

4. An article for introducing a dispensate into a fluid stream, comprising:
   a porous plastic matrix defining an internal network of passages and defining pores on the exposed surface of the matrix in fluid communication with the passages, the pores having an average size of from about 20 microns to about 200 microns; and
   a water-soluble or water-dispersible dispensate material, the dispensate residing within the passages;
   wherein the article is configured to reside inside a conduit for drawing a beverage from a container.

5. The article in accordance with claim 4, wherein the article is configured to frictionally engage an inside surface of the conduit.

6. The article in accordance with claim 4, wherein the article is cylindrical.

7. The article in accordance with claim 6, wherein the article has an outside diameter configured to frictionally engage the inside of the conduit.

8. The article in accordance with claim 4, wherein the article has at least two sides, and wherein the sides are configured to frictionally engage the inside of the conduit.

9. An assembly for introducing a dispensate into a fluid stream, comprising:
 an article comprising a porous plastic matrix defining an internal network of passages and defining pores on the exposed surface of the matrix in fluid communication with the passages, the pores having an average size of from about 20 microns to about 200 microns; and a water-soluble or water-dispersible dispensate material, the dispensate residing within the passages; and
 a conduit for drawing a beverage out of a container;
 wherein said article is operatively attached to the conduit; and
 wherein the article resides inside the conduit.

10. An assembly for introducing a dispensate into a fluid stream, comprising:
 an article comprising a porous plastic matrix defining an internal network of passages and defining pores on the exposed surface of the matrix in fluid communication with the passages, the pores having an average size of from about 20 microns to about 200 microns; and a water-soluble or water-dispersible dispensate material, the dispensate residing within the passages; and
 a member selected from the group consisting of a spigot and a faucet;
 wherein said article is operatively attached to the member.

11. A method for introducing a dispensate into a fluid stream, comprising:
 providing an article comprising a porous plastic matrix defining an internal network of passages and defining pores on the exposed surface of the matrix in fluid communication with the passages, wherein a water-soluble or water-dispersible dispensate material is positioned within the passages; and
 contacting a beverage with the exposed surface of the article to cause the dispensate material to be released into the beverage.

12. The method in accordance with claim 11, wherein the dispensate comprises a member selected from the group consisting of flavoring materials, coloring materials, medications, minerals, fluoride and caffeine.

13. The method in accordance with claim 11, wherein said contacting comprises placing the article and the beverage in a container for a period of time effective to cause a desired amount of dispensate to be dispensed into the beverage.

14. The method in accordance with claim 11, wherein said contacting comprises contacting the article with the beverage in a coffee maker.

15. The method in accordance with claim 14, wherein the article and a predetermined amount of coffee grounds are placed into a reservoir, and wherein said contacting is caused to occur in the reservoir as water flows into the reservoir and into contact with the coffee grounds and the article.

16. The method in accordance with claim 11, wherein the beverage is water, wherein the dispensate is a coffee flavoring and wherein said contacting comprises contacting the water with the exposed surface of the article and contacting the water with coffee grounds to provide a flavored coffee.

17. The method in accordance with claim 11, wherein the dispensate is selected from the group consisting of vanilla flavoring, hazelnut flavoring and cinnamon flavoring.

18. The method in accordance with claim 11, wherein the article comprises a disk shape.

19. The method in accordance with claim 11, wherein the article is attached to a member selected from a conduit, a bottle cap and a bottle neck, and wherein said contacting comprises causing a beverage to pass through the member in contact with the exposed surface of the article.

20. The method in accordance with claim 11, wherein the article is attached to a member selected from a beverage container and a bottle cap.

21. The method in accordance with claim 11, wherein the article is attached to a member selected from a faucet and a spigot, and wherein said contacting comprises causing a beverage to pass through the faucet or spigot in contact with the exposed surface of the article.

22. The method in accordance with claim 21, wherein the article is frictionally attached to the spigot or faucet.

23. The method in accordance with claim 11, wherein the article resides inside a conduit for drawing a beverage out of a container, and wherein said contacting comprises causing a beverage to pass through the conduit, thereby contacting the exposed surface of the article.

24. The method in accordance with claim 23, wherein the article frictionally engages an inside surface of the conduit.

25. The method in accordance with claim 23, wherein the article is cylindrical, wherein the article has an outside diameter whereby the article frictionally engages the inside of the conduit, and wherein the beverage passes through the article as it is drawn through the conduit.

26. The method in accordance with claim 23, wherein the article has at least two sides; wherein the sides are configured to frictionally engage the inside of the conduit; and wherein the beverage passes in contact with the article as it is drawn through the conduit.

27. The method in accordance with claim 11, wherein the dispensate is selected from the group consisting of a powder and a liquid.

28. The method in accordance with claim 11, wherein the matrix comprises a thermoplastic polymer.

29. The method in accordance with claim 23, in the thermoplastic polymer comprises a member selected from the group consisting of polypropylene and polyethylene.

30. The method in accordance with claim 11, wherein the pores have an average size of from about 20 microns to about 200 microns.

31. The method in accordance with claim 11, wherein the pores have an average size of from about 40 microns to about 150 microns.

32. The method in accordance with claim 11, wherein the pores have an average size of from about 134 microns to about 144 microns.

33. A method for introducing a dispensate into a fluid stream, comprising:
 providing a porous plastic matrix defining an internal network of passages and defining pores on the exposed surface of the matrix in fluid communication with the passages, the pores having an average size of up to about 200 microns, wherein a soluble or dispersible dispensate material is positioned within the passages; and
 contacting a fluid with the exposed surface of the article to cause the dispensate material to be released into the fluid.

* * * * *

UNITED STATES PATENT AND TRADEMARK OFFICE
CERTIFICATE OF CORRECTION

PATENT NO.   : 6,541,055 B1
DATED        : April 1, 2003
INVENTOR(S)  : Robert S. Luzenberg It is certified that error appears in the above-identified patent and that said Letters Patent is hereby corrected as shown below:

<u>Column 18,</u>
Line 41, please remove "23" and insert in lieu thereof -- 28 --.
Line 41, please remove the second occurrence of the word "in" and insert in lieu thereof -- wherein --.

Signed and Sealed this

Seventh Day of October, 2003

JAMES E. ROGAN
*Director of the United States Patent and Trademark Office*